(12) United States Patent
Hastings et al.

(10) Patent No.: US 8,284,400 B1
(45) Date of Patent: Oct. 9, 2012

(54) HAND-HELD COLOR MEASUREMENT DEVICE

(75) Inventors: Zachary Hastings, Lowell, MA (US);
Steven Vordenberg, Amherst, NH (US);
Andrew Masia, Newburyport, MA (US);
Daniel Dupuis, Concord, NH (US);
Marco Kessler, Hägglingen (CH); Beat Frick, Buchs (CH)

(73) Assignee: X-Rite Europe GmbH, Regensdorf (CH)

( * ) Notice: Subject to any disclaimer, the term of this patent is extended or adjusted under 35 U.S.C. 154(b) by 21 days.

(21) Appl. No.: 13/078,362

(22) Filed: Apr. 1, 2011

(51) Int. Cl.
*G01J 3/46* (2006.01)
(52) U.S. Cl. .......................... 356/402; 356/446
(58) Field of Classification Search .................. 356/402, 356/446
See application file for complete search history.

(56) References Cited

U.S. PATENT DOCUMENTS 6,061,140 A * 5/2000 Berg et al. ..................... 356/418
7,671,991 B2 3/2010 Von Orelli et al.

OTHER PUBLICATIONS

U.S. Appl. No. 13/078,291, filed Apr. 2011.
U.S. Appl. No. 13/078,328, filed Apr. 2011.

* cited by examiner

*Primary Examiner* — Layla Lauchman
(74) *Attorney, Agent, or Firm* — McCarter & English, LLP (57) ABSTRACT

A hand-held color measurement device is provided that includes a housing with a measurement unit which receives measurement light through a measurement window, converts it into measurement signals, processes the measurement signals to form digital color measurement data, and provides it via a communications interface. A U-shaped bracket is arranged on the housing and includes a middle portion in which a diffuser is integrated. The two side arms of the bracket are rotatably mounted on the housing such that the bracket can be pivoted by 180° from a monitor position to an ambient light position and back to the monitor position, and wherein the diffuser lies in front of the measurement window in the ambient light position and is situated at a rear wall of the housing opposite the front wall in the monitor position. A holding mechanism is provided on the housing and on the two side arms of the bracket which fixes the bracket in its monitor position or ambient light position, respectively. The hand-held color measurement device is simple in design and specially suitable for monitor, projection area and ambient light measurements.

23 Claims, 8 Drawing Sheets

HAND-HELD COLOR MEASUREMENT DEVICE

FIELD OF THE INVENTION

The invention relates to a hand-held color measurement device.

RELATED PRIOR ART

Hand-held color measurement devices of the generic type are available on the market in numerous embodiment variants. Such hand-held color measurement devices can be based on any measurement technologies. They can for example be embodied as filter measurement devices or as spectral measurement devices, wherein the latter are the most universal, since it is known that spectral measurement values can be used to derive any other variables which are of interest in practice (for example color values, color density values, etc.). Hand-held color measurement devices can also be embodied as autonomous devices or as peripheral measurement devices for use in connection with a controlling computer which evaluates measurement data. Autonomous hand-held color measurement devices include all the operating and display members necessary for measurement operations and also their own power supply and are in many cases also equipped with an interface for communicating with a computer, wherein both measurement data and control data can be exchanged with the computer. Hand-held color measurement devices which are configured as peripheral measurement devices do not generally have their own operating and display members and are controlled by the superordinated computer like any other peripheral computer device. For communicating with a computer, more modern hand-held color measurement devices are often for example fitted with a so-called USB (universal serial bus) interface, via which in many cases it is simultaneously also possible to supply power (from the attached computer). Such a design for measurement devices is described for example in U.S. Pat. No. 7,671,991 (≈EP 1 845 350 B1).

Hand-held color measurement devices of the generic type can be used for a large number of measurement tasks, depending on their embodiment and auxiliary equipment. One specific area of use for such hand-held color measurement devices is that of measuring on monitors, specifically for the purpose of calibrating and creating color profiles, wherein the hand-held color measurement device is manually positioned on the monitor to be measured and touches the monitor or is arranged at a small distance (preferably less than 20 cm) from the monitor. In other application functions, hand-held color measurement devices can also be used to measure the ambient light or possibly also for (remote) measurements on a projection area which is for example illuminated by an electronic projector (video projector). These points are likewise described for example in U.S. Pat. No. 7,671,991 (≈EP 1 845 350 B1).

SUMMARY OF THE INVENTION

It an intention of the present invention to now improve a hand-held color measurement device of the generic type to the effect that it is simpler and lighter in design than the known devices of this type, but can nonetheless be used for various measurement tasks, in particular measuring on monitors, projection areas and measuring ambient light, without separate auxiliary equipment.

This preferred object is solved by a hand-held color measurement device in accordance with the invention comprising a housing in which an opto-electronic measurement unit is situated which receives measurement light, emitted from a measurement object, through a measurement window in a front wall of the housing, converts it into corresponding electrical measurement signals, processes these measurement signals to form digital measurement data which characterizes the color of the measurement object, and provides it via a communications interface, wherein a substantially U-shaped bracket is arranged on the housing and comprises two substantially parallel side arms and a middle portion which connects them and is provided with an optical diffuser, wherein the two side arms are rotatably mounted on opposite walls of the housing such that the bracket can be pivoted by substantially 180° from a monitor position to an ambient light position and onwards or back to the monitor position, wherein when the bracket is in the ambient light position, the diffuser arranged in its middle portion lies in front of the measurement window in the front wall of the housing, and when the bracket is in the monitor position, the diffuser is situated at a rear wall of the housing opposite the front wall, and in that mutually cooperating holding means are provided on the housing and on the two side arms of the bracket and releasably fix the bracket in its monitor position or ambient light position, respectively.

Advantageous embodiments and developments of the hand-held color measurement device in accordance with the invention are the subject of the dependent claims.

The essence of the invention is as follows: a hand-held color measurement device comprises a housing in which an opto-electronic measurement unit is situated which receives measurement light, emitted from a measurement object, through a measurement window in a front wall of the housing, converts it into corresponding electrical measurement signals, processes these measurement signals to form digital measurement data which characterizes the color of the measurement object, and provides it via a communications interface. A substantially U-shaped bracket is arranged on the housing and comprises two substantially parallel side arms and a middle portion which connects them and is provided with an optical diffuser. The two side arms are rotatably mounted on opposite walls of the housing such that the bracket can be pivoted by substantially 180° from a monitor position to an ambient light position and onwards or back to the monitor position, wherein when the bracket is in the ambient light position, the diffuser arranged in its middle portion lies in front of the measurement window in the front wall of the housing, and when the bracket is in the monitor position, the diffuser is situated at a rear wall of the housing opposite the front wall. Mutually cooperating holding means are provided on the housing and on the two side arms of the bracket and releasably fix the bracket in its monitor position or ambient light position, respectively.

In accordance with one advantageous embodiment, mutually cooperating braking means are provided on the housing and on at least one side arm of the bracket and counteract the pivoting movement of the bracket relative to the housing with a defined pivoting resistance, such that the bracket is fixed in each pivoting position and is not adjusted in an uncontrolled manner.

In accordance with another advantageous embodiment, the middle portion of the bracket is embodied as a support base area, and the bracket forms an integrated device pedestal on which the housing is mounted such that it can be pivoted in a substantially vertical plane. This embodiment is particularly advantageous for measurements on projection areas.

The bracket is advantageously mounted on the housing such that it can additionally be moved (slightly) parallel to the longitudinal direction of its side arms. This enables the middle portion of the bracket to be positioned closer to the rear wall or front wall of the housing, respectively, in the monitor position and in the ambient light position, wherein the bracket is advantageously mounted and guided movably on the housing such that during the pivoting movement of the bracket out of its monitor position, its middle portion is simultaneously also temporarily raised from the rear wall of the housing, and such that during the pivoting movement of the bracket into the monitor position, its middle portion is simultaneously also moved towards the rear wall of the housing, wherein it is also advantageous if the bracket is mounted and guided movably on the housing such that in a pivoting position in which the diffuser arranged in its middle portion is situated in front of the measurement window in the front wall of the housing, the bracket can be moved in the longitudinal direction of its side arms towards the front wall of the housing, into the ambient light position, and is then fixed in the ambient light position by the holding means, and such that the bracket can be moved in the longitudinal direction of its two side arms away from the front wall of the housing, out of its ambient light position, counter to the fixing force of the holding means. To this end, guiding links are preferably provided on the housing, and link followers which engage with the guiding links are preferably provided on the side arms of the bracket.

It is also advantageous if a position sensor for detecting at least the ambient light position of the bracket is provided.

In accordance with one preferred embodiment, the hand-held color measurement device comprises a cable which is attached to the communications interface and is guided out of the housing through one of the two side arms of the bracket, substantially in the region of its pivoting axis.

It is then advantageous if the hand-held color measurement device is balanced in terms of its weight such that if the color measurement device is freely suspended by its cable and the bracket is situated in its monitor position, the front wall of the housing is inclined towards the cable by a small angle of inclination to the vertical. The angle of inclination is advantageously about 10° at most, preferably about 1 to 2°, specifically about 1.4°. This inclination of the device when suspended by the cable means that during measurements on a monitor, the housing always lies flush with the surface of the monitor, largely independently of its inclination to the vertical.

In order to conveniently position the color measurement device on a monitor, the cable is advantageously provided with a weighted body mounted on it such that it can be adjusted, preferably in the longitudinal direction, which substantially equalizes the weight of the color measurement device.

In accordance with one advantageous embodiment, the rear wall of the housing is embodied as a support base area and/or provided with a connecting portion, in particular a threaded socket, for a stand.

It is also advantageous if one of the two side arms of the bracket is embodied as a support base area for the color measurement device. Alternatively or additionally, one of the two side arms can also be provided with a connecting portion, in particular a threaded socket for fastening to a stand.

In accordance with a particularly advantageous embodiment, the opto-electronic measurement unit which exhibits an optical axis consists of a convex, preferably aspherical input lens which is arranged in the region of the measurement window and has a comparatively large diameter, an aperture for limiting the incident angular range to ±2 to 10°, an optical diffuser which has a depolarizing effect, a sensor lens with a diameter which is typically smaller than the input lens, and at least three photoelectric sensors which are sensitized to different spectral ranges using color filters, wherein the aperture lies substantially in the focal plane of the input lens, and the optical diffuser is arranged in the beam path in the immediate vicinity of the aperture and substantially in the focal plane of the sensor lens, wherein the filters and the sensors are arranged close to the optical axis and exposed to substantially parallel measurement light, and wherein the filters, the sensors and the diffuser are configured such that the electrical measurement signals generated by the sensors substantially represent the tristimulus color values XYZ according to CIE or a linear combination of these tristimulus color values XYZ. The spectral sensitivities of the color channels resulting from the filter spectra, the spectral sensitivities of the sensors used and the spectral transmission of all the other components of the optics, i.e. the lenses and the diffuser, are substantially configured to the spectral characteristics of the tristimulus color values XYZ according to CIE, such that the electrical measurement signals generated by the sensors substantially represent tristimulus color values XYZ according to CIE. Instead of the XYZ characteristics, the individual color channels and/or spectral sensitivities can also have a linear combination of the same.

The sensors are advantageously arranged at a distance from the sensor lens which substantially corresponds to the focal length of the sensor lens.

It is also advantageous if the aperture limits the incident angular range to ±4 to 6°.

In addition to the three sensors, a fourth sensor with no upstream color filter is preferably provided.

The optical diffuser advantageously consists of a molecularly scattering material comprising a large number of scattering centers having a very small scattering angle, in particular polyoxymethylene. The optical diffuser is advantageously embodied as a thin plate with a plate thickness of 0.3 to 0.5 mm, in particular about 0.4 mm. The optical diffuser advantageously has a translucence of at least 25%, preferably at least 50%. It is also advantageous if the optical diffuser depolarizes at least 95%, preferably at least 99%, of the light which passes through it.

The input lens preferably exhibits a focal length of 20 to 30 mm, in particular 24 to 26 mm.

The input lens is advantageously optimized for projecting parallel light onto a point, and the sensor lens is advantageously optimized for projecting light, which is divergently emitted from the diffuser, to infinity.

The aperture preferably exhibits an aperture diameter of 3 to 5 mm, in particular about 4 mm.

The color filters are advantageously embodied as transmission filters having a dielectric layered structure. The color filters are preferably positioned and fixed in an insert and/or filter holder which seals off the color filters and the sensors from each other and protects them against exposure to extraneous light and reciprocal scattered light.

BRIEF DESCRIPTION OF THE DRAWINGS

In the following, the invention is discussed in more detail on the basis of an example embodiment which is shown in the drawings. There is shown.

DESCRIPTION OF EXEMPLARY EMBODIMENTS

The following convention applies to the description of the figures below: if individual reference signs are not indicated in a figure, then reference is made in this respect to the remaining figures and the corresponding portions of the description. "Measurement object" is understood to mean light sources of any type which are to be gauged using the hand-held color measurement device, in particular monitors, projection areas which are illuminated by a projector, and ambient light.

Figure 1:
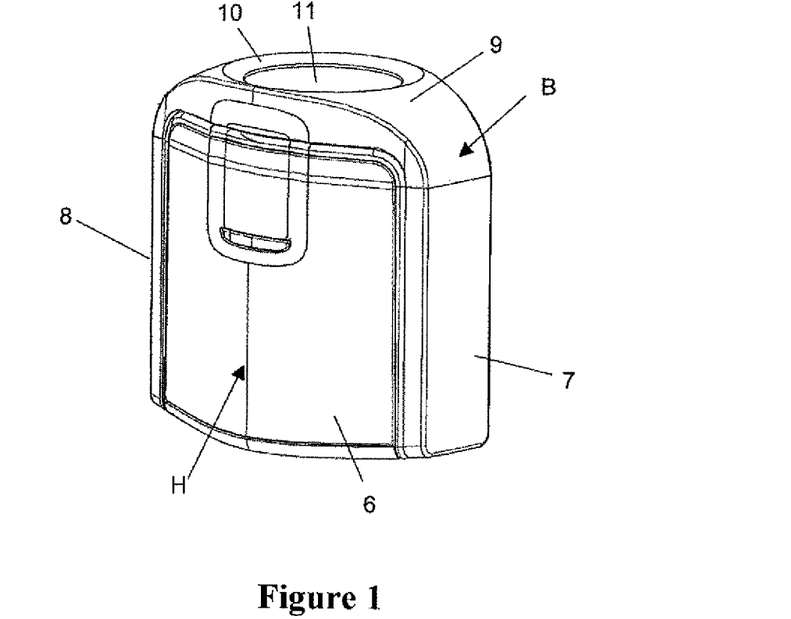
FIG. 1 a hand-held color measurement device in accordance with the invention in an oblique view, wherein the bracket is situated in its ambient light position.
Figure 2:
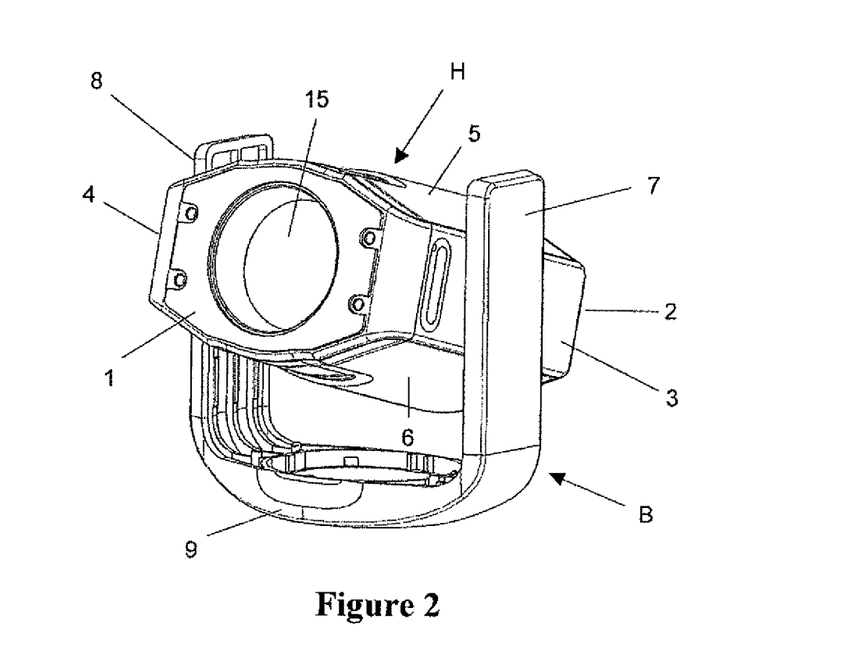
FIG. 2 the hand-held color measurement device of FIG. 1 in an oblique view, wherein the bracket assumes a pivoting position between the ambient light position and the monitor position.

The exterior shape of the hand-held color measurement device in accordance with the invention can best be seen from FIGS. 1 and 2. The device comprises a housing, which is indicated as a whole by H, and a substantially U-shaped bracket which is indicated as a whole by B and movably mounted on the housing in a way which is yet to be described. The housing H comprises a substantially planar front wall 1, a rear wall 2 (FIG. 3) which is parallel to the front wall 1 and likewise substantially planar, a substantially planar lower wall 3, an upper wall 4 (FIG. 3) which is parallel to the lower wall 3 and likewise substantially planar, and two side walls 5 and 6 which are curved slightly outwards.

Figure 3:
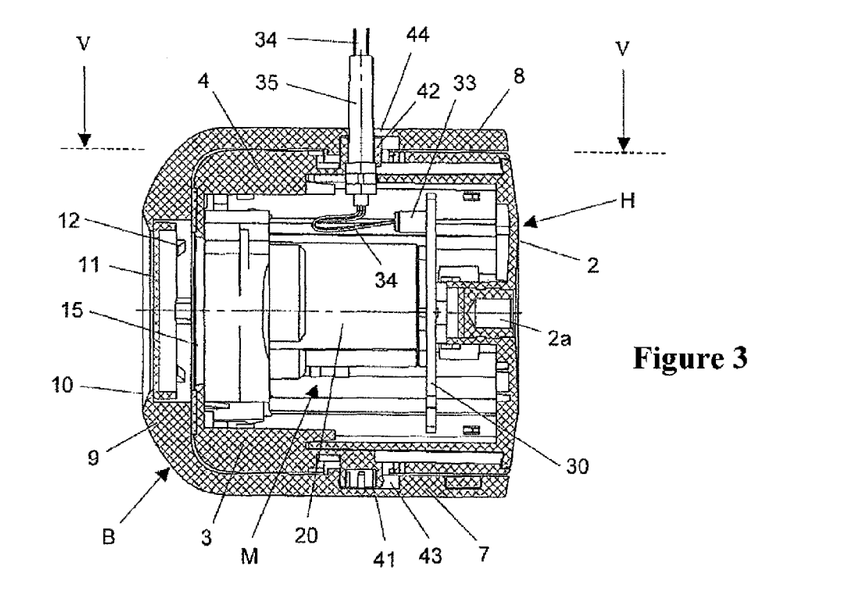
FIG. 3 an axial section through the hand-held color measurement device of FIG. 1, with the bracket in its ambient light position.

The rear wall 2 of the housing H is embodied as a support base area and provided with a connecting portion, formed in this case by a threaded socket 2a, for a stand (FIG. 3). This enables the hand-held color measurement device to be positioned or attached to a stand, as shown in FIG. 1.

The bracket B comprises two parallel side arms 7 and 8 and an outwardly rounded middle portion 9 which connects them. A window 10, into which an optical diffuser 11 is inserted and secured at its edge by means of undercut latching nubs 12 (FIGS. 3 and 4), is provided in the middle portion 9 of the bracket B.

The middle portion 9 of the bracket B is embodied as a support base area, such that the bracket B can to a certain extent serve as an integrated device pedestal for the hand-held color measurement device, on which the housing H is mounted such that it can be pivoted (in a vertical plane). This is discussed in more detail further below.

The side aim 7 of the bracket B is embodied to be substantially planar on the outside and serves as a(nother) pedestal for the hand-held measurement device. Alternatively or additionally, the side arm 7 can also be equipped, in an analogous way to the rear wall 2 of the housing H, with a connecting portion (not shown in the drawings), in particular a threaded socket for a stand.

Figure 4:
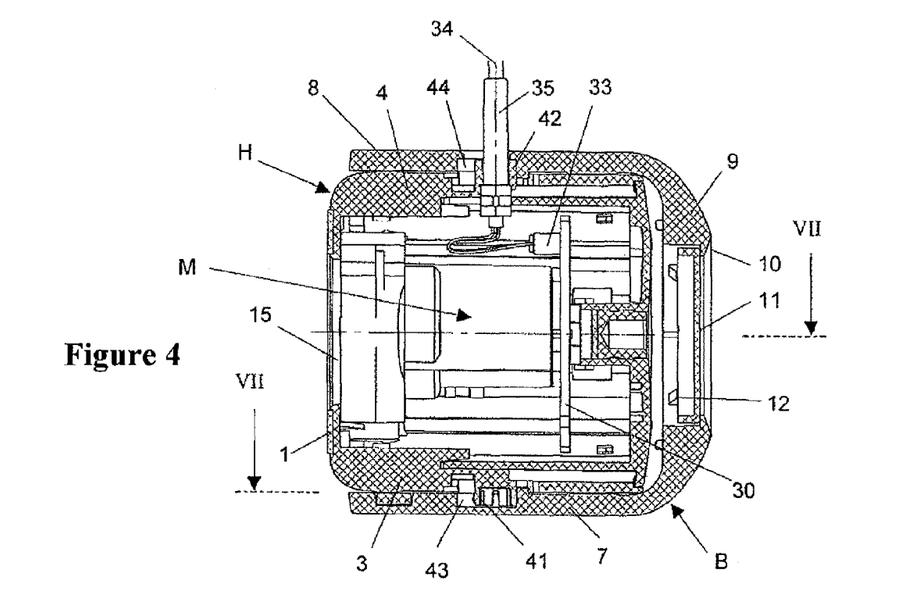
FIG. 4 an axial section through the hand-held color measurement device of FIG. 1, with the bracket in its monitor position.

An opto-electronic measurement unit which is indicated as a whole by M is accommodated in the housing H (FIGS. 3 and 4). A measurement window 15 is provided in the front wall 1 of the housing H, wherein measurement light can enter the measurement unit M through said measurement window 15. The opto-electronic measurement unit receives measurement light emitted from a measurement object, converts it into corresponding electrical measurement signals, processes these measurement signals to form digital measurement data which characterizes the color of the measurement object, and provides this measurement data via a communications interface. The measurement unit M comprises a tube 20 with various optical components, and a printed circuit board 30 on which photoelectric sensors are arranged which are exposed to measurement light via the optical components and convert it into corresponding electrical measurement signals. Measurement electronics on the printed circuit board which cooperate with the sensors control the sensors and provide their measurement signals in a digitized form at a communications interface 33.

Figure 11:
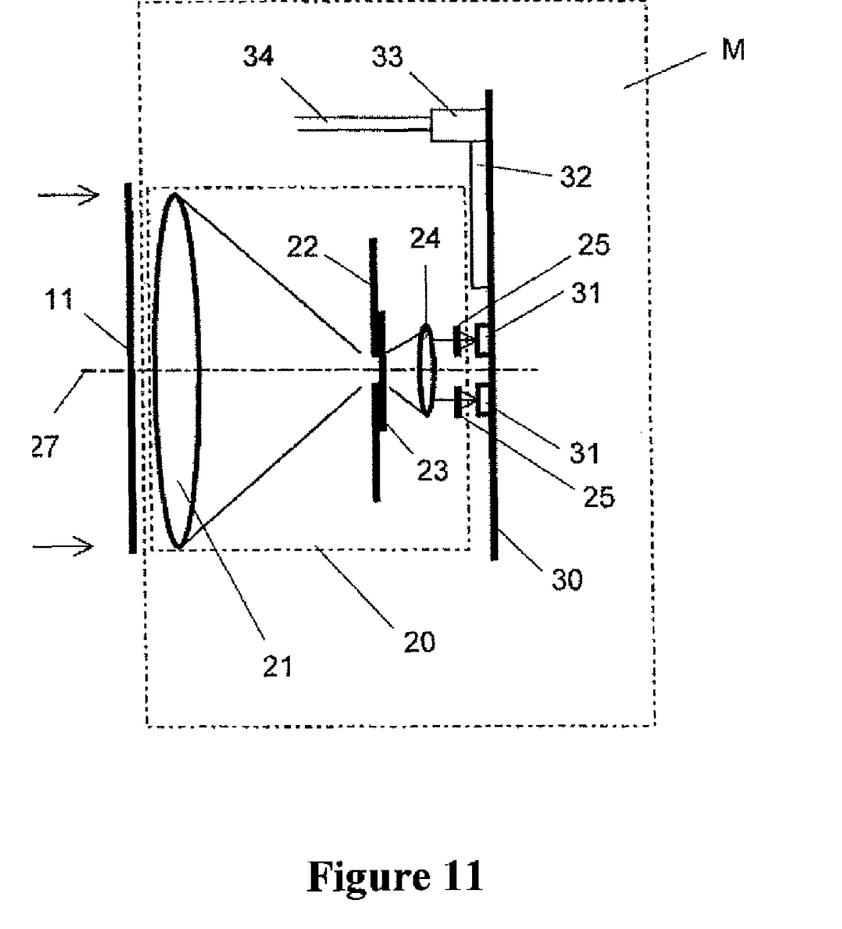
FIG. 11 a schematic representation of the opto-electronic measurement unit of the hand-held color measurement device.

FIG. 11 schematically shows a particularly advantageous embodiment of the opto-electronic measurement unit M.

The tube 20 contains an input lens 21, an aperture 22, a diffuser 23 and a sensor lens 24. The measurement unit M also comprises color filters 25 and photoelectric sensors 31 on the printed circuit board 30 and digital measurement electronics 32 which for their part comprise said communications interface 33.

The aperture 22 is situated in the focal plane of the input lens 21 and limits the incident angular range to typically about ±4 to 6°. The diffuser 23 is arranged directly on the aperture 22 and depolarizes the measurement light. The diffuser 23 is arranged in the focal plane of the sensor lens 24. The light emitted from the diffuser 23 as a secondary light source is projected to infinity by the sensor lens 24, such that the color filters 25 and then the sensors 31 assigned to them are exposed to said light substantially perpendicularly. The color filters 25 and the sensors 31 are arranged close to and surrounding the optical axis 27 of the measurement beam path. Four sensors 31 are provided in total, three of which are sensitized to different spectral ranges by three color filters. The fourth sensor receives unfiltered light. The spectral characteristics of the color filters 25, the sensors 31 and the diffuser 23 and of the two lenses 21 and 24 are configured and/or mutually adjusted such that the measurement signals generated by the sensors 31 directly correspond to the tristimulus color values XYZ or a linear combination of the same.

The way in which the sensors 31 are controlled by the electronic measurement unit 32, and the digital measurement data provided at the communications interface 33, is conventional in and of itself (for example, as described in U.S. Pat. No. 7,671,991 mentioned at the beginning) and therefore need not be discussed in greater detail.

The digitized measurement data can be fed to an external device, in particular an external a) computer, via the communications interface 33 in a way which is known in its own right, for processing and/or evaluating. To this end, a cable 34 is attached to the communications interface 33 and guided to the outside through the upper wall 4 of the housing H (FIGS. 3 and 4). The communications interface 33 can for example be embodied as a so-called USB interface and can simultaneously also serve to supply power to the hand-held color measurement device in a way which is known in its own right.

The opto-electronic measurement unit M can of course also be structured differently, for example broadly as described in U.S. Pat. No. 7,671,991 mentioned at the beginning.

The parallel side arms 7 and 8 of the bracket B are rotatably articulated on the lower wall 3 and upper wall 4 of the housing H and can be pivoted around the housing H, wherein two pivoting positions are distinguished: in one pivoting position, referred to in the following as the ambient light position, the middle portion 9 of the bracket B is situated centrally at the front wall 1 of the housing H, such that the diffuser 11 is positioned exactly in front of the measurement window 15 of the housing H. The ambient light position of the bracket B can be seen in FIG. 3. FIG. 11 likewise shows the diffuser 11 positioned in front of the measurement window and, respectively, the input lens 21 behind it. The pivoting position of the bracket B which is referred to in the following as the monitor position is situated diametrically opposite to the ambient light position with respect to the housing H. A pivoting movement of the bracket by 180° lies between the ambient light position and the monitor position. When the bracket B is in the monitor position, the middle portion 9 which includes the diffuser 11 is situated centrally at the rear wall 2 of the housing H.

By rotatably mounting the bracket B on the housing H, it is thus possible to pivot the bracket B from the monitor position to the ambient light position and from the ambient light position back to the monitor position, wherein it is possible to pivot in both directions in the example embodiment shown. In the monitor position and in the ambient light position, holding means which are yet to be discussed ensure that the bracket B is (releasably) fixed in the respective position.

In order that the bracket B does not move in an uncontrolled manner between its monitor position and its ambient light position, in which it is already fixed by the holding means described, the hand-held color measurement device is equipped with braking means which counteract the pivoting movement of the bracket with a defined pivoting resistance. These braking means are substantially a special embodiment of the bearing sleeve 41 for the lower side arm 7 of the bracket B. The bearing sleeve 41 is embodied with axially parallel slits, such that it comprises a circular array of teeth 41a. The teeth 41a press elastically outwards against the inner wall of the bearing opening 43 and thus form a sort of brake shoe which brakes the pivoting movement of the bracket somewhat. Analogous braking means could of course also be provided on the upper side of the hand-held color measurement device.

The bracket B, together with the diffuser 11 arranged in its middle portion 9, serves to switch the hand-held color measurement device between different measurement functions. With the bracket B in the monitor position, the hand-held color measurement device is used for measurements on monitors, wherein the measurement light passes through the measurement window 15 unaltered, directly into the opto-electronic measurement unit M. When the bracket B is in the ambient light position, the diffuser 11 is situated in front of the measurement window 15. In this position, the hand-held color measurement device is used for ambient light measurements.

When the bracket B is in the monitor position, the hand-held color measurement device could in principle also be used for measurements on projection areas illuminated for example by a projector. For this purpose, however, it is much more practical and therefore more advantageous to position the hand-held measurement device as shown in FIG. 2, wherein the bracket B serves as an integrated device pedestal on which the housing H is mounted such that it can be pivoted in a vertical plane, in order to align the input window and/or measurement unit M with the projection area to be gauged, wherein the position of the bracket relative to the housing H lies between the monitor position and the ambient light position. The aforementioned braking means ensure that the relative pivoting position between the bracket B and the housing H is not unintentionally altered, wherein it is also a substantial feature that the centre of gravity of the housing H is as far as possible situated in the vicinity of the pivoting axis of the bracket B, such that the weight-related turning moments are as small as possible and the braking force of the braking means correspondingly need not be configured to be too great.

In order to avoid incorrect manipulations of the hand-held color measurement device, a position sensor can advantageously be provided which detects at least the ambient light position of the bracket. Such a position sensor can advantageously be formed by a Hall sensor which is arranged in the housing close to its upper or lower wall and cooperates with a magnet which is embedded in one of the side arms of the bracket. The external controller for the hand-held color measurement device can evaluate the position sensor and for example block measurement functions which are not suited to the position of the bracket.

Figure 7:
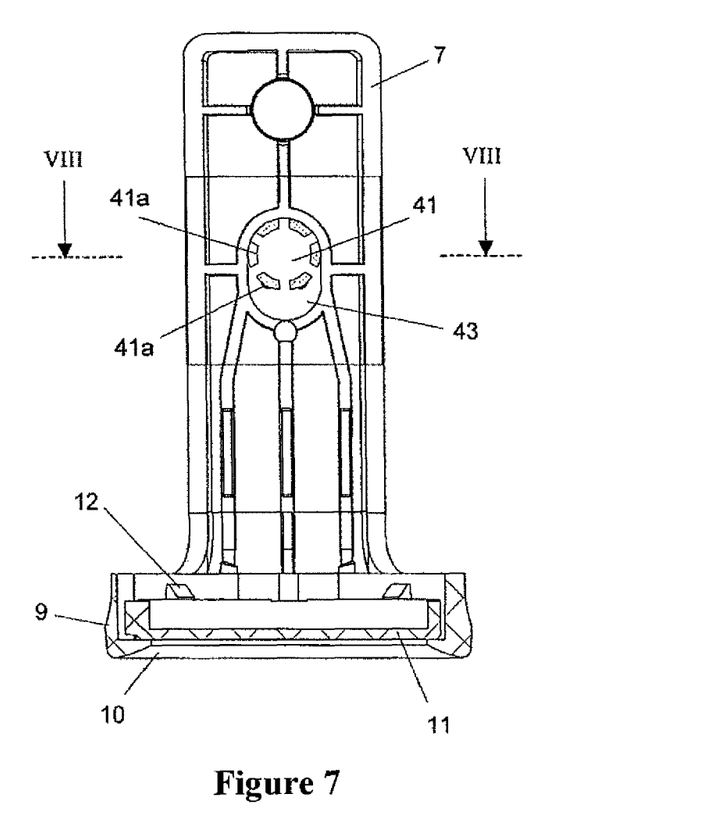
FIG. 7 a partially sectioned view of the bracket, substantially along the line VII-VII in FIG. 4.
Figure 8:
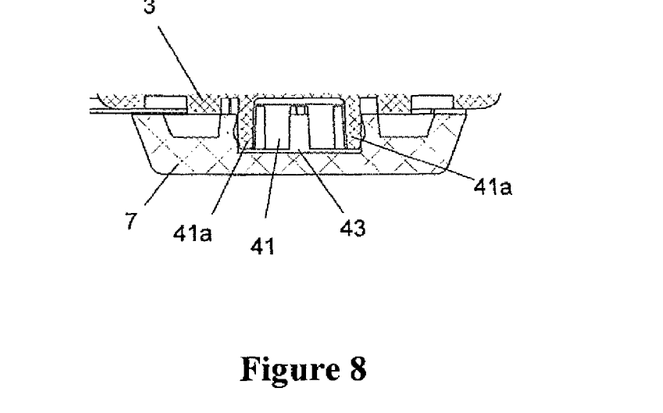
FIG. 8 a section along the line VIII-VIII in FIG. 7.

In accordance with another important aspect of the invention, the bracket B is not only mounted on the housing H such that it can be pivoted, but additionally can also to a certain extent be moved translationally in a direction perpendicular to the front wall 1 and/or rear wall 2 of the housing, for reasons which are discussed in more detail further below. The pivot bearing of the bracket B is specially embodied in order for this translational movement of the bracket B to be possible in the first place. A fixed bearing sleeve 41 or 42 is respectively embodied and/or molded on each of the lower wall 3 and upper wall 4 of the housing H, wherein the two side arms 7 and 8 of the bracket B can rotate about said bearing sleeves. An elongated bearing opening 43 or 44, respectively, is provided on the inner sides of each of the two side arms 7 and 8, wherein one of the two bearing sleeves engages with each of the bearing openings (FIGS. 3 and 4). The width of the bearing openings 43 and 44 corresponds substantially to the outer diameter of the bearing sleeves 41 and 42; the length of the two bearing openings as measured in the longitudinal direction of the side arms 7 and 8 is slightly greater. The shape of the bearing openings can best be seen in FIG. 7 in which the side arm 7 together with the bearing opening 43 is shown as viewed from within. The bearing opening 43 in the side arm 7 is a blind hole, while the bearing opening 44 in the side arm 8 is open towards both sides, i.e. is continuous. As is easily seen, the difference between the length and the width of the bearing openings 43 and 44 determines the maximum translational freedom of movement of the bracket B.

A cable sleeve 35 extends through the bearing sleeve 42 in the upper wall 4 of the housing H and the bearing opening 44 in the side arm 8 of the bracket B and is fastened in the upper wall 4 of the housing H. The cable 34 is guided through the cable sleeve 35 to the outside and is also simultaneously strain-relieved by the cable sleeve 35. The cable sleeve 35 is thus situated in the region of the pivoting axis of the bracket B.

Figure 10:
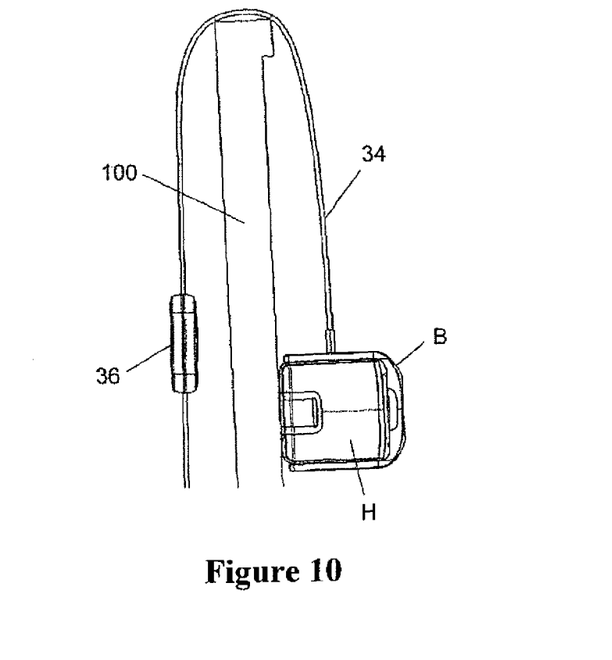
FIG. 10 the hand-held color measurement device being used in practice for measuring on a monitor.

For measurements on monitors, it is usual to attach the hand-held color measurement device to the monitor by means of suitable holding devices, such that its measurement window is situated directly at the illuminated area of the monitor. In the case of the hand-held color measurement device in accordance with the invention, this is particularly simply enabled by suspending it on the monitor by its cable 34. To this end, the cable 34 is placed over the upper edge of the monitor 100, as shown in FIG. 10, such that the hand-held measurement device hangs at the measure location on the illuminated area of the monitor which is of interest. The cable portion which hangs down on the rear side of the monitor 100 is provided with a weighted body 36 which faints a counterweight to the housing H and the components situated in and on it. The housing thus remains positionally stable, wherein the weighted body 36 is length-adjustably fastened to the cable 34 in order to adapt to different monitor sizes. The weighted body 36 can for example be equipped with a manually releasable clamp for this purpose.

Figure 9:
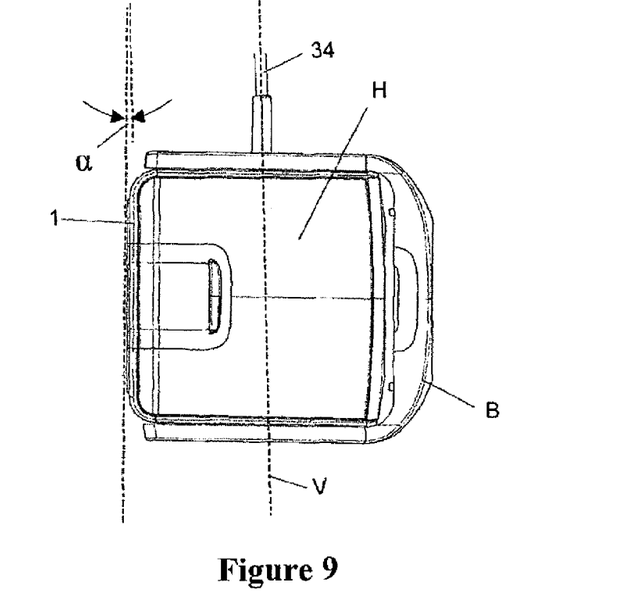
FIG. 9 a lateral view of the hand-held color measurement device when suspended by its cable.

As already mentioned, when measuring on a monitor, the front wall 1 of the hand-held measurement device which comprises the measurement opening 15 is intended to lie flat against the illuminated area of the monitor. In order to enable this, irrespective (to a certain extent) of the inclination of the monitor and/or the illuminated area of the monitor, the housing of the hand-held color measurement device together with the components contained in it and fastened to it is specially balanced in terms of its weight in accordance with another important aspect of the invention. This balancing is selected such that when the color measurement device is freely suspended by its cable 34 and the bracket B is situated in its monitor position, the front wall 1 of the housing H is inclined towards the cable 34 by an angle of inclination α to the vertical V, as shown in FIG. 9. Due to this rearward inclination of the front wall 1 up towards the cable 34, the front wall 1 still lies flush with the illuminated area of the monitor even when the latter is inclined with a slight overhang. The angle of inclination α is about 10° at most, preferably about 1 to 2° and specifically about 1.4°.

In order to achieve a compact design and a favorable exterior shape of the hand-held color measurement device, it is important for the middle portion 9 of the bracket B to be situated as close as possible to the rear wall 2 or front wall 1 of the housing H, respectively, and preferably to directly abut the rear wall or front wall, respectively, in both the monitor position and the ambient light position of the bracket. In order to achieve this, the bracket B is—as already mentioned—not only mounted on the housing H such that it can be pivoted, but additionally can also to a certain extent be moved translationally in a direction perpendicular to the front wall 1 and/or rear wall 2 of the housing. In relation to the monitor position and ambient light position of the bracket B, the translational movement runs parallel to the longitudinal extension of the two side arms 7 and 8 of the bracket B. The pivoting movement and the translational movement of the bracket are discussed below on the basis of FIGS. 5a, 5b, 6a and 6b.

Figure 5A:
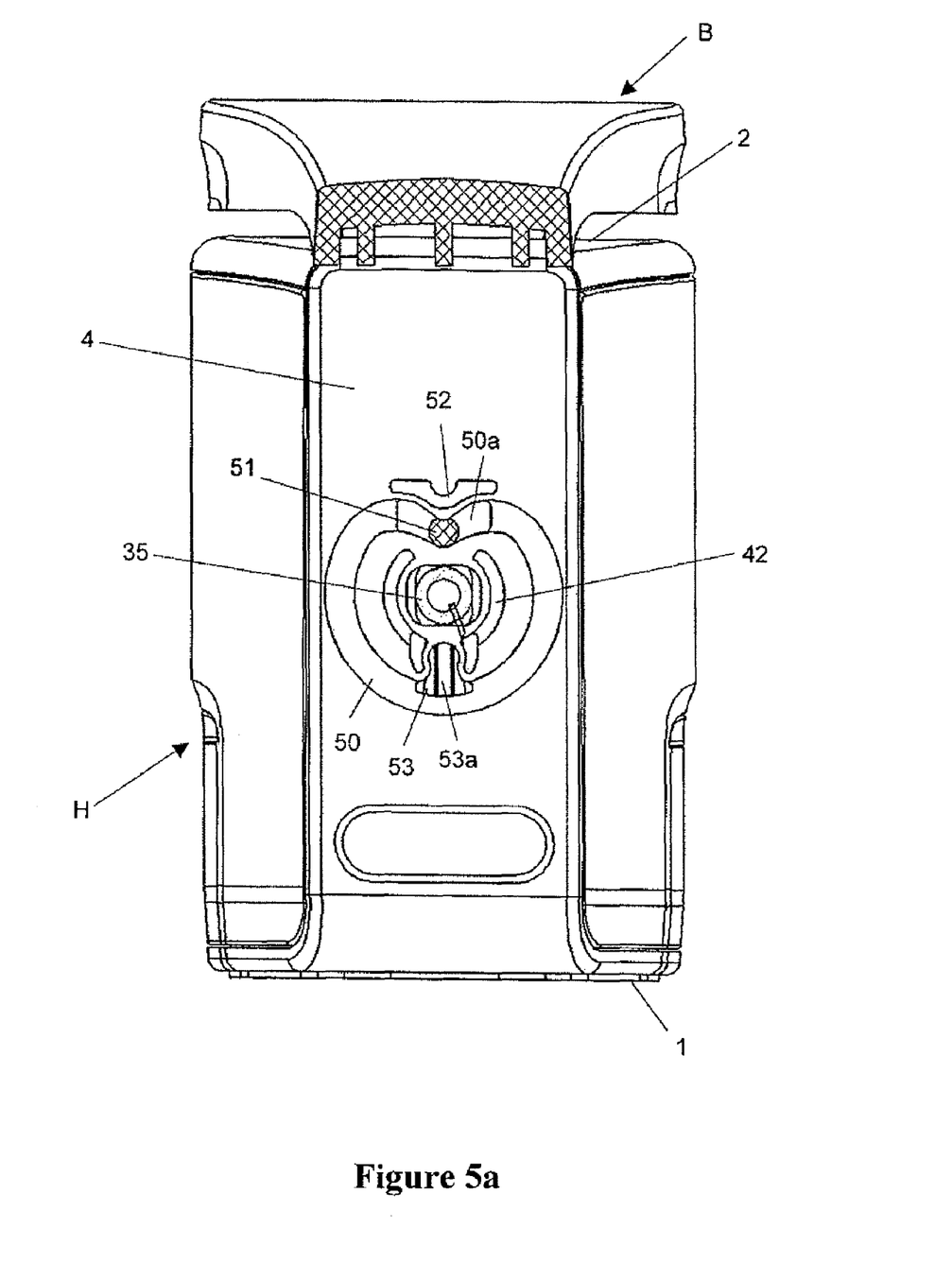
FIGS. 5a and 5b two sections through the hand-held color measurement along the line V-V in FIG. 3, in two different positions of the bracket.
Figure 5B:
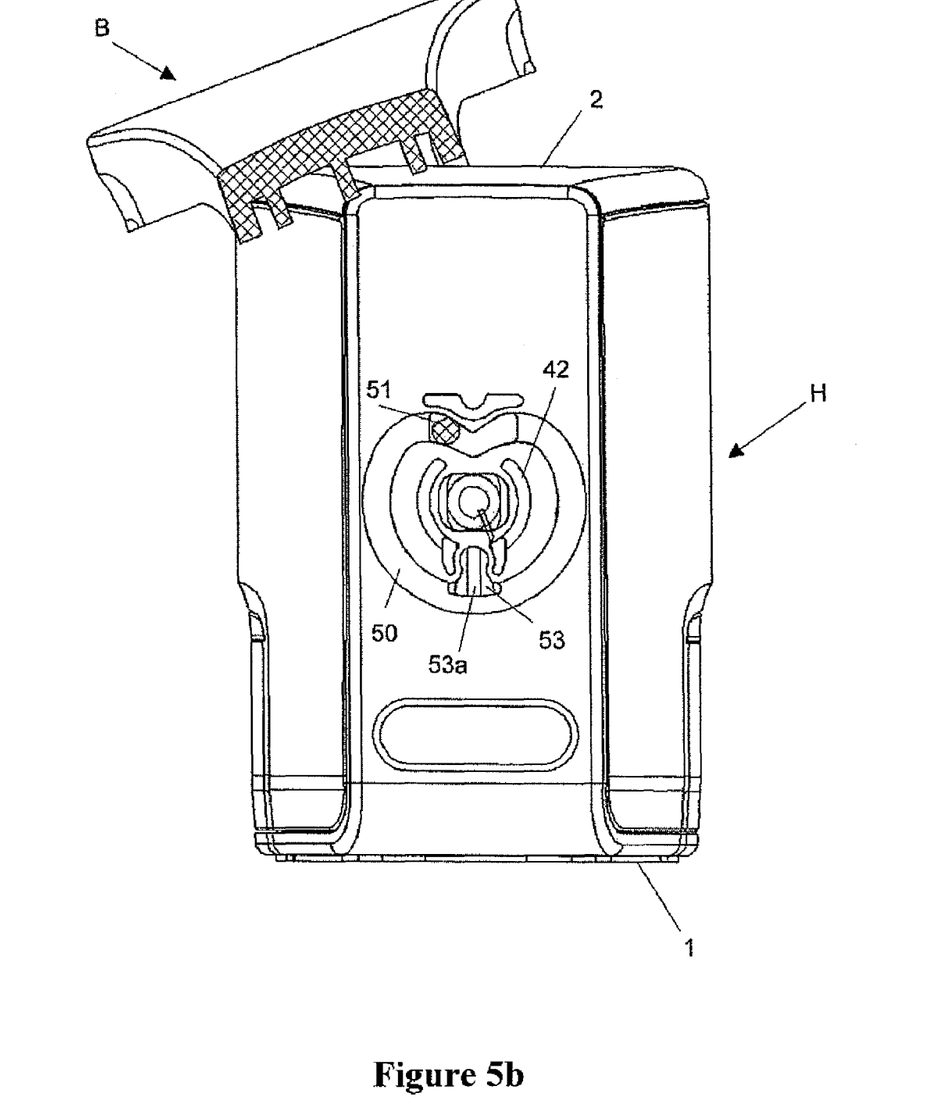
Figure 6A:
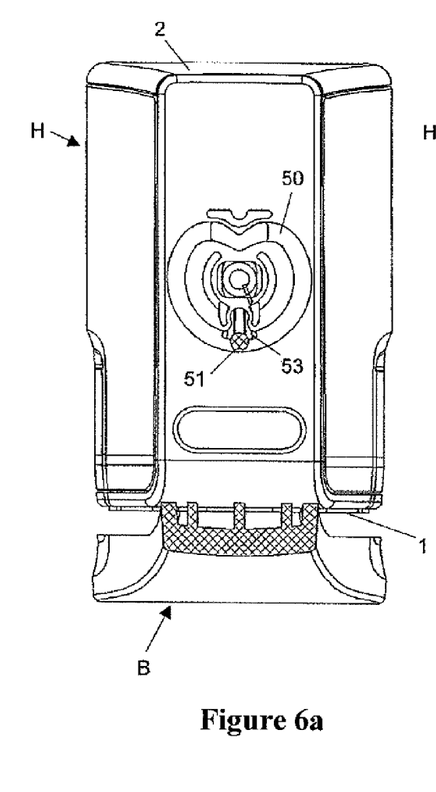
FIGS. 6a and 6b two sectional views analogous to FIGS. 5a and 5b, but exhibiting two other pivoting positions of the bracket.
Figure 6B:
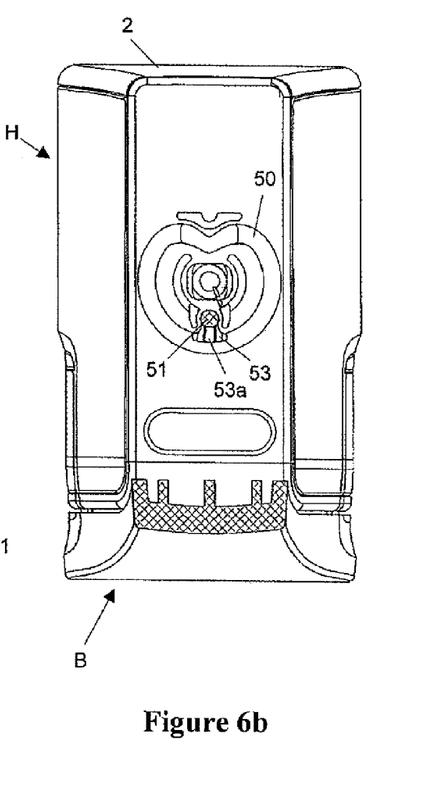

In FIG. 5a, the bracket B is situated in its monitor position. FIG. 5b shows how the bracket B is pivoted out of its monitor position (towards the ambient light position), wherein it is shown that the middle portion 9 of the bracket is simultaneously moved slightly away from the rear wall 2 of the housing. This is achieved by a special link guide which is discussed in more detail further below. If the bracket B is pivoted further by 180°, it passes into a pivoting position in which its middle portion 9 is situated in front of the front wall 1 of the housing at a distance, as shown in FIG. 6a. The bracket B is then moved translationally out of this pivoting position towards the front wall, until the middle portion 9 abuts the front wall 1. This position of the bracket, which is shown in FIG. 6b, is then the ambient light position.

In order to move the bracket B back into its monitor position, the bracket is first drawn away from the front wall translationally, until it has reached the position shown in FIG. 6a. The bracket is then pivoted (in one direction or the other). Just before the bracket reaches its monitor position, it is moved far enough beyond the rear wall that it does not catch on the edge of the housing between the rear wall 2 and one or other of the side walls 5 and 6 of the housing H when it is pivoted further (FIG. 5b). As it is pivoted further into the monitor position, the bracket is drawn closer to the rear wall 2 again by means of the special link guide (FIG. 5a).

Said link guide comprises a guiding link 50 on the outer sides of each of the lower wall 3 and upper wall 4 of the housing H, and trunnion-shaped link followers 51 which are arranged and/or molded on the inner sides of the two side arms 7 and 8 of the bracket B and respectively engage with the guiding links 50. When the bracket B is pivoted, the link followers 51 move in and along the guiding links 50 and thus generate a corresponding movement of the bracket B.

The guiding links 50 run approximately circular for the most part. On the sides facing the rear wall 2 of the housing H, however, the guiding links 50 have an indentation 50a which darts away from the rear wall 2, such that an approximately heart-shaped or cherry-shaped form results. The indentations 50a mean that the middle portion 9 of the bracket B is guided onto the rear wall 2 of the housing H during the pivoting movement of the bracket into the monitor position, and conversely is temporarily moved away from the rear wall during the pivoting movement out of the monitor position. The link guides 50 are embodied to be slightly narrower in the region of the indentations 50a and thus pinch the trunnion-shaped link followers 51. This (releasably) fixes the bracket B in its monitor position (FIG. 5a). In this way, the indentations 50a together with a slightly elastic supporting element 52 and the link followers 51 form holding means for the bracket B.

On the sides facing the front wall 1, a guiding element 53 comprising an open guiding groove 53a is provided in each of the guiding links 50. The guiding elements 53 and/or their guiding grooves 53a extend radially inwards from the guiding links 50, perpendicular to the front wall 1. When the bracket B is moved into the pivoting position shown in FIG. 6a, the link followers 51 latch slightly onto the guiding elements 53 (FIG. 6a). If the bracket B is then pushed onto the front wall 1, into its ambient light position, the link followers 51 slide into the guiding grooves 53a and splay them slightly (FIG. 6b). This (releasably) latches the bracket B in its ambient light position, i.e. the guiding elements 53 together with the link followers 51 likewise form holding means for the bracket B.

The invention claimed is:

1. A hand-held color measurement device, comprising
a housing in which an opto-electronic measurement unit is situated which receives measurement light, emitted from a measurement object, through a measurement window in a front wall of the housing, converts it into corresponding electrical measurement signals, processes these measurement signals to form digital measurement data which characterizes the color of the measurement object, and provides it via a communications interface,
wherein a substantially U-shaped bracket is arranged on the housing and includes two substantially parallel side arms and a middle portion which connects them and is provided with an optical diffuser,
wherein the two side arms are rotatably mounted on opposite walls of the housing such that the bracket can be pivoted by substantially 180° from a monitor position to an ambient light position and onwards or back to the monitor position, and wherein when the bracket is in the ambient light position, the diffuser arranged in its middle portion lies in front of the measurement window in the front wall of the housing, and when the bracket is in the monitor position, the diffuser is situated at a rear wall of the housing opposite the front wall, and in that mutually cooperating holding means are provided on the housing and on the two side arms of the bracket and releasably fix the bracket in its monitor position or ambient light position, respectively.

2. The hand-held color measurement device according to claim 1, wherein mutually cooperating braking means are provided on the housing and on at least one side arm of the bracket and counteract the pivoting movement of the bracket relative to the housing with a defined pivoting resistance.

3. The hand-held color measurement device according to claim 1, wherein the middle portion of the bracket is embodied as a support base area, and the bracket forms an integrated device pedestal on which the housing is mounted such that it can be pivoted in a substantially vertical plane.

4. The hand-held color measurement device according to claim 1, wherein the bracket is mounted on the housing such that it can additionally be moved to a limited extent parallel to the longitudinal direction of its side arms.

5. The hand-held color measurement device according to claim 4, wherein the bracket is mounted and guided movably on the housing such that during the pivoting movement of the bracket out of its monitor position, its middle portion is simultaneously also temporarily raised from the rear wall of the housing (H), and such that during the pivoting movement of the bracket into the monitor position, its middle portion is simultaneously also moved towards the rear wall of the housing.

6. The hand-held color measurement device according to claim 4, wherein the bracket is mounted and guided movably on the housing such that in a pivoting position in which the diffuser arranged in its middle portion is situated in front of the measurement window in the front wall of the housing at a distance, the bracket can be moved in the longitudinal direction of its side arms towards the front wall of the housing, into the ambient light position, and is then fixed in the ambient light position by the holding means, and such that the bracket can be moved in the longitudinal direction of its two side arms away from the front wall of the housing, out of its ambient light position, counter to the fixing force of the holding means.

7. The hand-held color measurement device according to claim 4, wherein guiding links are provided on the housing, and link followers which engage with the guiding links are provided on the side arms of the bracket.

8. The hand-held color measurement device according to claim 1, further comprising a cable which is attached to the communications interface and is guided out of the housing through the upper wall of the housing and through one of the two side arms of the bracket, substantially in the region of its pivoting axis.

9. The hand-held color measurement device according to claim 8, wherein said color measurement device is balanced in terms of its weight such that if the color measurement device is freely suspended by its cable and the bracket is situated in its monitor position, the front wall of the housing is inclined towards the cable by an angle of inclination of up to about 10° to the vertical.

10. The hand-held color measurement device according to claim 3, wherein said color measurement device includes a cable which is attached to the communications interface and is guided out of the housing through the upper wall of the housing and through one of the two side arms of the bracket, substantially in the region of its pivoting axis.

11. The hand-held color measurement device according to claim 10, wherein said color measurement device is balanced in terms of its weight such that if the color measurement device is freely suspended by its cable and the bracket is situated in its monitor position, the front wall of the housing is inclined towards the cable by an angle of inclination of up to about 10° to the vertical.

12. The hand-held color measurement device according to claim 8, wherein the cable is provided with a weighted body mounted on it such that it can be adjusted in the longitudinal direction.

13. The hand-held color measurement device according to claim 1, wherein the rear wall of the housing is embodied as a support base area and/or comprises a connecting portion, in particular a threaded socket, for a stand.

14. The hand-held color measurement device according to claim 1, wherein one of the two side arms of the bracket is embodied as a pedestal.

15. The hand-held color measurement device according to claim 14, wherein the pedestal includes a connecting portion that is configured to cooperate with a stand.

16. The hand-held color measurement device according to claim 1, wherein the opto-electronic measurement unit which exhibits an optical axis consists of a convex input lens which is arranged in the region of the measurement window and has a comparatively large diameter, an aperture for limiting the incident angular range to ±2 to 10°, an optical diffuser which has a depolarizing effect, a sensor lens and at least three photoelectric sensors which are sensitized to different spectral ranges using color filters, wherein the aperture lies substantially in the focal plane of the input lens, and the optical diffuser is arranged in the beam path in the immediate vicinity of the aperture and substantially in the focal plane of the sensor lens, wherein the filters and the sensors are arranged close to the optical axis and exposed to substantially parallel measurement light, and wherein the filters, the sensors and the diffuser are configured such that the electrical measurement signals generated by the sensors substantially represent the tristimulus color values XYZ according to CIE or a linear combination of these tristimulus color values XYZ.

17. The hand-held color measurement device according to claim 3, wherein the opto-electronic measurement unit which exhibits an optical axis consists of a convex input lens which is arranged in the region of the measurement window and has a comparatively large diameter, an aperture for limiting the incident angular range to ±2 to 10°, an optical diffuser which has a depolarizing effect, a sensor lens and at least three photoelectric sensors which are sensitized to different spectral ranges using color filters, wherein the aperture lies substantially in the focal plane of the input lens, and the optical diffuser is arranged in the beam path in the immediate vicinity of the aperture and substantially in the focal plane of the sensor lens, wherein the filters and the sensors are arranged close to the optical axis and exposed to substantially parallel measurement light, and wherein the filters, the sensors and the diffuser are configured such that the electrical measurement signals generated by the sensors substantially represent the tristimulus color values XYZ according to CIE or a linear combination of these tristimulus color values XYZ.

18. The hand-held color measurement device according to claim 1, further comprising a cable which is attached to the communications interface and is guided out of the housing through the upper wall of the housing and through one of the two side arms of the bracket, substantially in the region of its pivoting axis, and wherein it is balanced in terms of its weight such that if the color measurement device is freely suspended by its cable and the bracket is situated in its monitor position, the front wall of the housing is inclined towards the cable by an angle of inclination of up to about 10° to the vertical, and wherein the opto-electronic measurement unit which exhibits an optical axis consists of a convex input lens which is arranged in the region of the measurement window and has a comparatively large diameter, an aperture for limiting the incident angular range to ±2 to 10°, an optical diffuser which has a depolarizing effect, a sensor lens and at least three photoelectric sensors which are sensitized to different spectral ranges using color filters, wherein the aperture lies substantially in the focal plane of the input lens, and the optical diffuser is arranged in the beam path in the immediate vicinity of the aperture and substantially in the focal plane of the sensor lens, wherein the filters and the sensors are arranged close to the optical axis and exposed to substantially parallel measurement light, and wherein the filters, the sensors and the diffuser are configured such that the electrical measurement signals generated by the sensors substantially represent the tristimulus color values XYZ according to CIE or a linear combination of these tristimulus color values XYZ.

19. The hand-held color measurement device according to claim 3, further comprising a cable which is attached to the communications interface and is guided out of the housing through the upper wall of the housing and through one of the two side arms of the bracket, substantially in the region of its pivoting axis, and wherein it is balanced in terms of its weight such that if the color measurement device is freely suspended by its cable and the bracket is situated in its monitor position, the front wall of the housing is inclined towards the cable by an angle of inclination of up to about 10° to the vertical, and wherein the opto-electronic measurement unit which exhibits an optical axis consists of a convex input lens which is arranged in the region of the measurement window and has a comparatively large diameter, an aperture for limiting the incident angular range to ±2 to 10°, an optical diffuser which has a depolarizing effect, a sensor lens and at least three photoelectric sensors which are sensitized to different spectral ranges using color filters, wherein the aperture lies substantially in the focal plane of the input lens, and the optical diffuser is arranged in the beam path in the immediate vicinity of the aperture and substantially in the focal plane of the sensor lens, wherein the filters and the sensors are arranged close to the optical axis and exposed to substantially parallel measurement light, and wherein the filters, the sensors and the diffuser are configured such that the electrical measurement signals generated by the sensors substantially represent the tristimulus color values XYZ according to CIE or a linear combination of these tristimulus color values XYZ.

20. The hand-held color measurement device according to claim 16, wherein the diffuser includes a molecularly scattering material comprising a large number of scattering centers having a very small scattering angle, is embodied as a thin plate with a plate thickness of 0.3 to 0.5 mm, exhibits a translucence of at least 25%, and depolarizes at least 95% of the light which passes through it.

21. The hand-held color measurement device according to claim 17, wherein the diffuser includes a molecularly scattering material having a very small scattering angle, is embodied as a thin plate with a plate thickness of 0.3 to 0.5 mm, exhibits a translucence of at least 25%, and depolarizes at least 95% of the light which passes through it.

22. The hand-held color measurement device according to claim 18, wherein the diffuser includes a molecularly scattering material having a very small scattering angle, is embodied as a thin plate with a plate thickness of 0.3 to 0.5 mm, exhibits a translucence of at least 25%, and depolarizes at least 95% of the light which passes through it.

23. The hand-held color measurement device according to claim 19, wherein the diffuser includes a molecularly scattering material having a very small scattering angle, is embodied as a thin plate with a plate thickness of 0.3 to 0.5 mm, exhibits a translucence of at least 25%, and depolarizes at least 95% of the light which passes through it.

* * * * *

UNITED STATES PATENT AND TRADEMARK OFFICE
CERTIFICATE OF CORRECTION

PATENT NO. : 8,284,400 B1
APPLICATION NO. : 13/078362
DATED : October 9, 2012
INVENTOR(S) : Zachary Hastings et al.

Page 1 of 1

It is certified that error appears in the above-identified patent and that said Letters Patent is hereby corrected as shown below:

On the title page item (75) Inventors:

remove: Marco Kessler, Hägglingen (CH)

insert: --Marco Kessler, Häegglingen (CH)--

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,284,400 B1  
APPLICATION NO. : 13/078362  
DATED : October 9, 2012  
INVENTOR(S) : Zachary Hastings et al.

Page 1 of 1

It is certified that error appears in the above-identified patent and that said Letters Patent is hereby corrected as shown below:

On the title page item (75) Inventors:

remove: Marco Kessler, Häegglingen (CH)

insert: --Marco Kessler, Hägglingen (CH)--

This certificate supersedes the Certificate of Correction issued May 20, 2014.

Signed and Sealed this  
Fourteenth Day of April, 2015

Michelle K. Lee  
*Director of the United States Patent and Trademark Office*